US 6,711,643 B2

(12) United States Patent
Park et al.

(10) Patent No.: US 6,711,643 B2
(45) Date of Patent: Mar. 23, 2004

(54) METHOD AND APPARATUS FOR INTERRUPT REDIRECTION FOR ARM PROCESSORS

(75) Inventors: Kyoung Park, Daejeon (KR); Sang Man Moh, Daejeon (KR); Yong Youn Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/028,702

(22) Filed: Dec. 28, 2001

(65) Prior Publication Data

US 2003/0110336 A1 Jun. 12, 2003

(30) Foreign Application Priority Data

Dec. 11, 2001 (KR) .......................................... 2001-78194

(51) Int. Cl.⁷ .............................. G06F 13/24; G06F 9/46
(52) U.S. Cl. ..................................... 710/260; 709/318
(58) Field of Search ............................... 710/260, 266, 710/268, 261, 264; 703/25; 709/102

(56) References Cited

U.S. PATENT DOCUMENTS

| | | | | |
|---|---|---|---|---|
| 4,907,149 A | * | 3/1990 | Gula et al. ................... | 710/264 |
| 5,265,255 A | * | 11/1993 | Bonevento et al. ......... | 710/260 |
| 5,283,904 A | * | 2/1994 | Carson et al. .............. | 710/266 |
| 5,428,799 A | * | 6/1995 | Woods et al. ............... | 710/266 |
| 5,758,169 A | * | 5/1998 | Nizar et al. ................. | 710/266 |
| 5,848,279 A | * | 12/1998 | Wu et al. .................... | 710/268 |
| 5,857,090 A | * | 1/1999 | Davis et al. ................. | 703/25 |
| 6,115,778 A | * | 9/2000 | Miyake et al. .............. | 710/260 |
| 6,154,785 A | | 11/2000 | Lakhat et al. | |
| 6,189,065 B1 | | 2/2001 | Arndt et al. | |
| 6,219,741 B1 | * | 4/2001 | Pawlowski et al. ......... | 710/260 |
| 6,237,058 B1 | | 5/2001 | Nakagawa | |
| 2002/0016880 A1 | * | 2/2002 | Bhagat ........................ | 710/261 |
| 2002/0073131 A1 | * | 6/2002 | Brenner et al. ............. | 709/102 |
| 2002/0166018 A1 | * | 11/2002 | Kim ............................ | 710/260 |

FOREIGN PATENT DOCUMENTS

EP  0 427 540 A2 * 5/1991  ........... G06F/13/24

OTHER PUBLICATIONS

Technical Reference Manual, "ARM PrimeCell—Vectored Interrupt Controller", ARM Limited, 2000.

* cited by examiner

Primary Examiner—Glenn A. Auve
Assistant Examiner—Christopher E. Lee
(74) Attorney, Agent, or Firm—Jacobson Holman PLLC

(57) ABSTRACT

Disclosed herein is an interrupt redirection apparatus and method for inter-processor communication. The apparatus includes a plurality of ARM processors, a vectored interrupt controller, an interrupt command register, an interrupt data register for designating the contents of each interrupt, an interrupt signal generation unit, and a bus interface unit used for providing read and write accesses of both the interrupt command register and the interrupt data register. The vectored interrupt controller for receiving interrupts generated by hardware for performing a specific function under the control of each ARM processor and interrupts generated by peripheral hardware, and transferring each interrupt as each interrupt request signal to an ARM processor designated as a master processor. The interrupt command register designates targets and kinds of each interrupt to perform a function for receiving an interrupt redirection command and activating an interrupt request signal. The interrupt signal generation unit reads the contents and activates an interrupt request signal.

2 Claims, 7 Drawing Sheets

METHOD AND APPARATUS FOR INTERRUPT REDIRECTION FOR ARM PROCESSORS

FIELD OF THE INVENTION

The present invention relates generally to an interrupt redirection apparatus and method for inter-processor communication (IPC), and more particularly to an apparatus and method, in which a master processor redirects an interrupt to a slave processor in a system-on-chip (SoC) having two or more ARM processor cores.

BACKGROUND OF THE INVENTION

Generally, in order to construct a multiprocessor system using a plurality of processors, interrupt distribution and inter-processor communication must be supported.

Interrupts are used to inform processors of the occurrence of irregular and exceptional events, and are classified into internal interrupts and external interrupts. Such an internal interrupt is an event occurring in hardware within the processor while the process executes instructions, and occurs in cases such as the execution of a privileged instruction and the generation of overflow of an arithmetic logic unit. Such an external interrupt (hereinafter, referred to as an interrupt) is used for informing processors of the generation of errors of hardware outside the processor, like a peripheral device, and the operation state of peripheral hardware.

The above description of the typical interrupt is disclosed in detail in "Computer System Architecture" by "M. M. Mano" and "Computer Architecture and Organization" by "John P. Hayes".

A conventional method for informing a processor of an interrupt is to apply an interrupt signal to the processor. Interrupt signals differ from one processor to another, and, for example, for an ARM processor, two interrupt signals composed of a Fast Interrupt Request (FIQ) and an Interrupt ReQuest (IRQ) are provided.

Because the interrupt can be generated in a variety of peripheral devices outside the processor, an interrupt controller is used for collecting interrupt signals received from a plurality of interrupt sources and sending the interrupt signals to the processor as interrupt request signals.

In a multiprocessor system using a plurality of processors, inter-processor communication is required. In the multiprocessor system, the processors divide a specific task and process the divided operations simultaneously. At this time, inter-processor communication is required for performing the synchronization between processors and informing the processors of status thereof. Here, a common variable method that sets the threshold region in a shared memory and constructs a common variable in the threshold region, and a message passing method that constructs a specific communication channel between processors, and transmits/receives messages through the communication channel are used in the inter-processor communication.

The communication method using the common variable is used in the multiprocessor system employing the shared memory and can be realized using only software without additional hardware devices. On the other hand, the message passing method uses a communication channel provided by hardware regardless of the sharing of the memory.

The above description of the conventional inter-processor communication is disclosed in detail in "Advanced Computer Architecture, Parallelism, Scalability, Programmability" by "Kai Whang".

The ARM (Advanced RISC Machines) processor does not provide a multiprocessor function, for example, interrupt redistribution and communication channel hardware according to its structural characteristics. Further, in a "PrimeCell", which is a semiconductor library provided by ARM Corporation, design resources for supporting the multiprocessor are not supported.

Meanwhile, conventional technologies related to the interrupt distribution and the inter-processor communication are described as follows.

The ARM Corporation provides an interrupt controller named a Vectored Interrupt Controller (VIC) which performs a vectored interrupt control function so as to design an ARM processor based system-on-chip. The vectored interrupt controller collects interrupts generated in a plurality of peripheral devices and transfers the interrupts to the IRQ and FIQ which are interrupt reception signals of the ARM processor using a point-to-point connection method. The vectored interrupt controller is an interrupt controller for a single ARM processor, and is disadvantageous in that, when it is adapted to a design structure having a plurality of ARM processors therein, each exclusive vectored interrupt controller must be connected to each ARM processor. Further, the vectored interrupt controller is problematic in that, because the same interrupt source is connected to a plurality of vectored interrupt controllers, it is not clear which processor must process a generated interrupt, thus causing a problem in software development. In a design structure using a plurality of ARM processors, the inter-processor communication must be supported, and in the inter-processor communication, the message passing method for asynchronously transferring messages to the processor as well as the communication using a predetermined region of the shared memory must be supported. In order to perform an asynchronous inter-processor communication, a function for requesting an interrupt between processors is required. However, the vectored interrupt controller provided by the ARM Corporation is problematic in that it must employ a plurality of vectored interrupt controllers so as to allow mutual communication between the processors.

Further, U.S. Pat. No. 6,189,065 B1 owned by IBM Corporation discloses the invention entitled "Method and Apparatus for interrupt load balancing for PowerPC processors", as described below in detail.

In the above patent, interrupt buses between processors are constructed in the form of a "Daisy-chain" using interrupt reception and transmission hardware devices included in a processor. Further, an interrupt queue and a counter are included in the processor. The above patent primarily claims hardware having a function such that if an interrupt is transferred to a specific processor, the hardware confirms the interrupt counter in the processor and transmits the interrupt to an interrupt reception unit of the processor adjacent to the specific processor with the "Daisy-chain" construction if the counted value exceeds a predetermined number, and an interrupt load distribution method utilizing the hardware. However, the invention of the patent is disadvantageous in that the interrupt transmission and reception hardware devices are additionally constructed inside or outside each processor, interrupt transmission and reception units between adjacent processors are connected to each other with the "Daisy-Chain" construction, and especially, an additional interrupt bus must be constructed so as to transmit/receive an interrupt between processors. Consequently, the invention cannot be applied to design structures using ARM processors.

Further, U.S. Pat. No. 6,237,058 B1 owned by NEC Corporation discloses the invention entitled "Interrupt load distribution system for shared bus type multiprocessor systems and interrupt load distribution method", as described below in detail.

Referring to the patent, in common bus based multiprocessor systems, the operating system (OS) stores interrupt processing load details according to processors through a table managing interrupt processing statistics according to processors. The operating system constructs an interrupt scheduling information table therein on the basis of the interrupt statistics table according to processors. The interrupt scheduling information table is used as a table for determining which processor processes a corresponding interrupt according to kinds of interrupts.

In order to perform an interrupt scheduling operation, an input/output controller has an interrupt target information table for designating target processors according to interrupts therein, and the operating system periodically updates the interrupt target information table to uniformly distribute interrupts to each processor.

The above patent primarily claims a method for adding a function for managing interrupt processing details to the operating system, controlling the interrupt target information table included in the input/output controller on the basis of the function, and then enabling the uniform distribution of the interrupt loads in the common bus based multiprocessing system. However, the invention of the patent is disadvantageous in that it requires the support of the operating system for interrupt processing statistics and the input/output controller must have the interrupt target information table therein.

In U.S. Pat. No. 6,154,785 entitled "Inter-processor Communication System" and owned by Network Equipment Technology Corporation, an inter-processor communication method in a multiprocessor system is disclosed, as described below in detail.

In the patent, processors use exclusive controllers for the inter-processor communication, and these exclusive controllers are connected to each other through an inter-processor communication bus. The exclusive controllers are each comprised of a communication command register, a semaphore register, a status register, a local memory interface unit, and an inter-processor communication bus interface unit. Each processor generates a communication request by writing a communication command into the command register of the exclusive controller, and the exclusive controller decodes the command in the command register and transmits the communication contents to an opposite exclusive controller through the inter-processor communication bus. Each processor recognizes the results of message transmission or reception by polling the status register of the exclusive controller or receiving an interrupt. The inter-processor communication method is preferably designed to transmit and receive short messages between master and slave processors, as in the case of communicating between a management processor and each node processor in a network equipment construction, or a case of transmitting and receiving management messages between a host processor and a network processor in a network interface device.

The above patent relates to an inter-processor communication apparatus and method constructed using exclusive controllers proposed for inter-processor communication and an inter-processor communication bus used for providing the connection between the exclusive controllers. Further, the patent primarily claims the construction of the exclusive controller, a message format, and a message transmission/reception method. However, the invention of the patent is problematic in that it must have each exclusive controller according to processors, and it utilizes the inter-processor communication exclusive bus for connecting between exclusive controllers.

SUMMARY OF THE INVENTION

Accordingly, the present invention has been made keeping in mind the above problems occurring in the prior art, and an object of the present invention is to provide an interrupt redirection apparatus and method for inter-processor communication, in which a master processor redirects a received interrupt to a slave processor and which generates an interrupt for supporting inter-processor communication when a system-on-chip having a plurality of ARM processors therein is designed.

In order to accomplish the above object, the present invention provides an interrupt redirection apparatus for a system-on-chip having a plurality of ARM processors and a vectored interrupt controller for receiving interrupts generated peripheral hardware, and transferring each interrupt to an ARM processor designated as a master processor. The interrupt redirection apparatus comprises an interrupt command register for designating targets and kinds of each interrupt to perform a function for receiving an interrupt redirection command through a bus interface unit and activating an interrupt request signal connected to a slave processor such that the master processor resends a received corresponding interrupt to an ARM processor designated as the slave processor; an interrupt data register for designating the contents of each interrupt; an interrupt signal generation unit for reading the contents in the interrupt command register and activating an interrupt request signal connected to a specific ARM processor; and a bus interface unit used for providing read and write accesses of both the interrupt command register and the interrupt data register.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
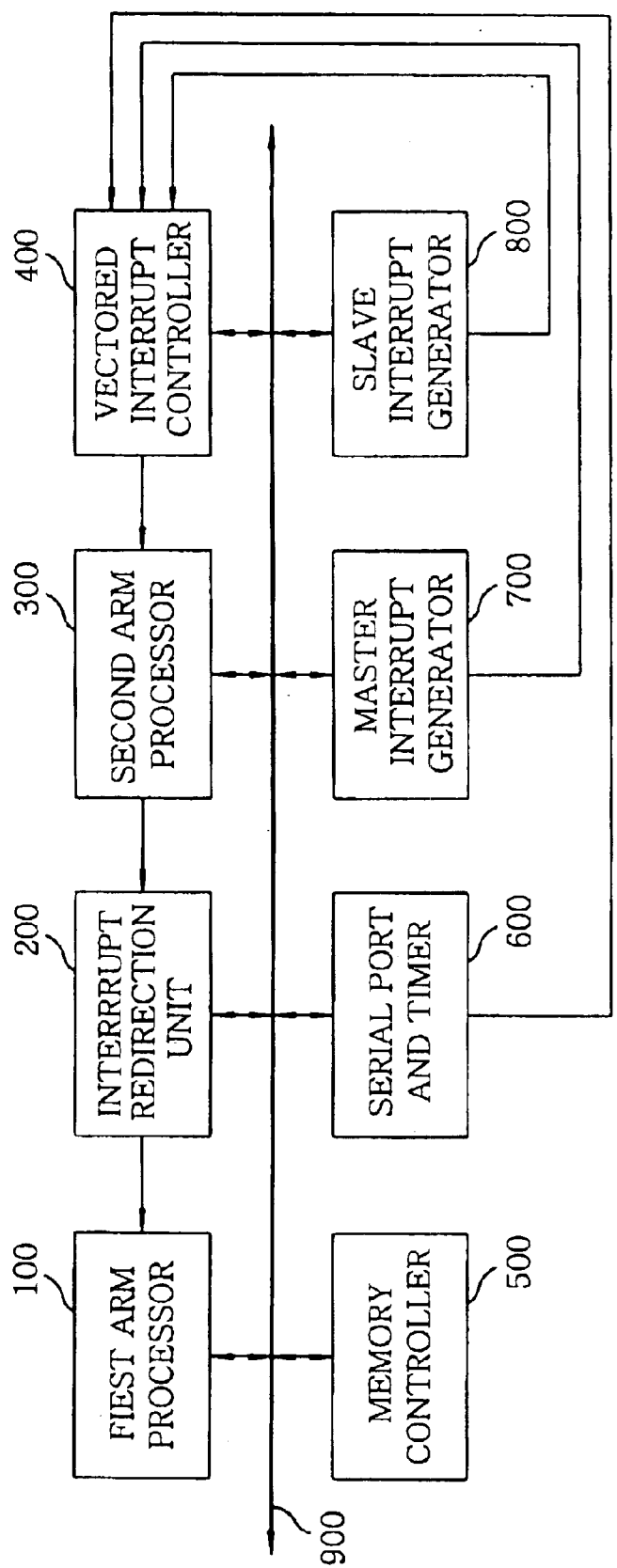
FIG. 1 is a block diagram of an interrupt redirection apparatus for inter-processor communication according to a preferred embodiment of the present invention.

FIG. 1 is a block diagram of an interrupt redirection apparatus for inter-processor communication according to a preferred embodiment of the present invention. Referring to FIG. 1, the interrupt redirection apparatus comprises a first ARM processor 100, a second ARM processor 300, a vectored interrupt controller 400, an interrupt redirection unit 200, a master interrupt generation unit 700, a slave interrupt generation unit 800, a serial port and timer 600, a memory controller 500 and an internal bus 900. The first ARM processor 100 functions as a slave processor, and the second ARM processor 300 functions as a master processor. The vectored interrupt controller 400 selects an interrupt from a plurality of interrupt request signals according to their priorities and sends the selected interrupt via interrupt request signal to the second ARM processor 300 designated as a master processor. The interrupt redirection unit 200 resends an interrupt to the first ARM processor 100 designated as a slave processor in response to a request of the master processor 300, and supports the inter-processor communication. The master interrupt generation unit 700 which is a hardware device for performing an arbitrary function under the control of the master processor requests an interrupt to the master processor. The slave interrupt generation unit 800 which is a hardware device for performing an arbitrary function under the control of the slave processor requests an interrupt to the slave processor. The memory controller 500 controls access to the external memory of a chip, and the internal bus 900 is used for connecting the above processors and devices to each other.

The present invention having the above construction is described in detail, with reference to FIGS. 2 to 5.

Figure 2:
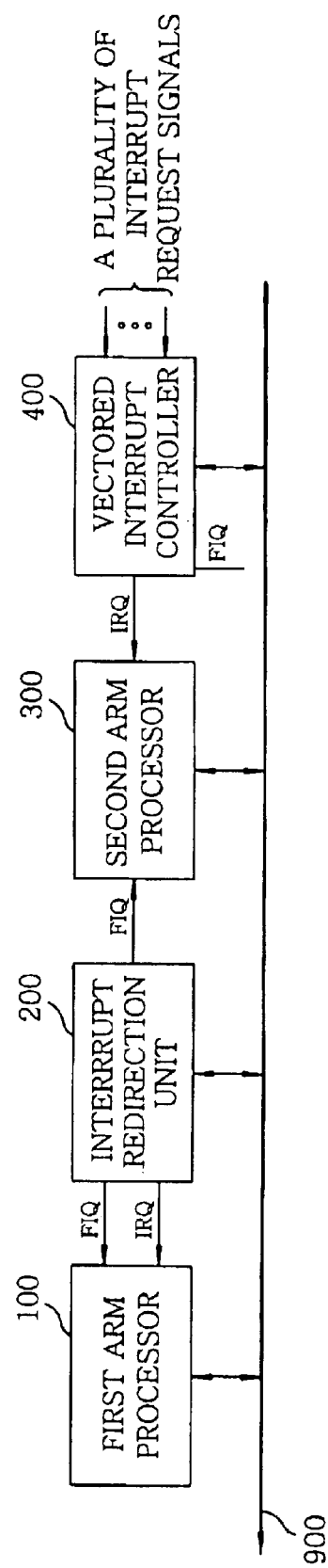
FIG. 2 is a block diagram showing the connection between first and second ARM processors and an interrupt redirection unit included in the interrupt redirection apparatus of FIG. 1.

FIG. 2 is a block diagram showing the connection between first and second ARM processors 100 and 300 and the interrupt redirection unit 200 of FIG. 1.

Referring to FIG. 2, the vectored interrupt controller 400, which is a library provided by ARM Corporation, selects an interrupt from a plurality of interrupt request signals generated from functioning hardware devices in the system-on-chip on the basis of their priorities and requests the selected interrupt from the second ARM processor 300 designated as the master processor by sending an IRQ signal to the second ARM processor 300.

The master processor 300 reads the status register of the vectored interrupt controller 400 and analyzes the source of the interrupt so as to process the interrupt received through the IRQ signal. If the interrupt is requested by a functioning unit controlled by the first ARM processor 100 designated as the slave processor according to the analyzed results, the master processor 300 sends both an interrupt redirection request and content of corresponding interrupt to the interrupt redirection unit 200 using the internal bus 900.

The interrupt redirection unit 200 requests an interrupt by activating an FIQ signal connected to the slave processor 100 according to the received interrupt redirection request.

After receiving the interrupt through the FIQ signal, the slave processor 100 accesses the interrupt redirection unit 200 through the internal bus 900, confirms the contents of the corresponding interrupt and processes the interrupt.

Figure 3:
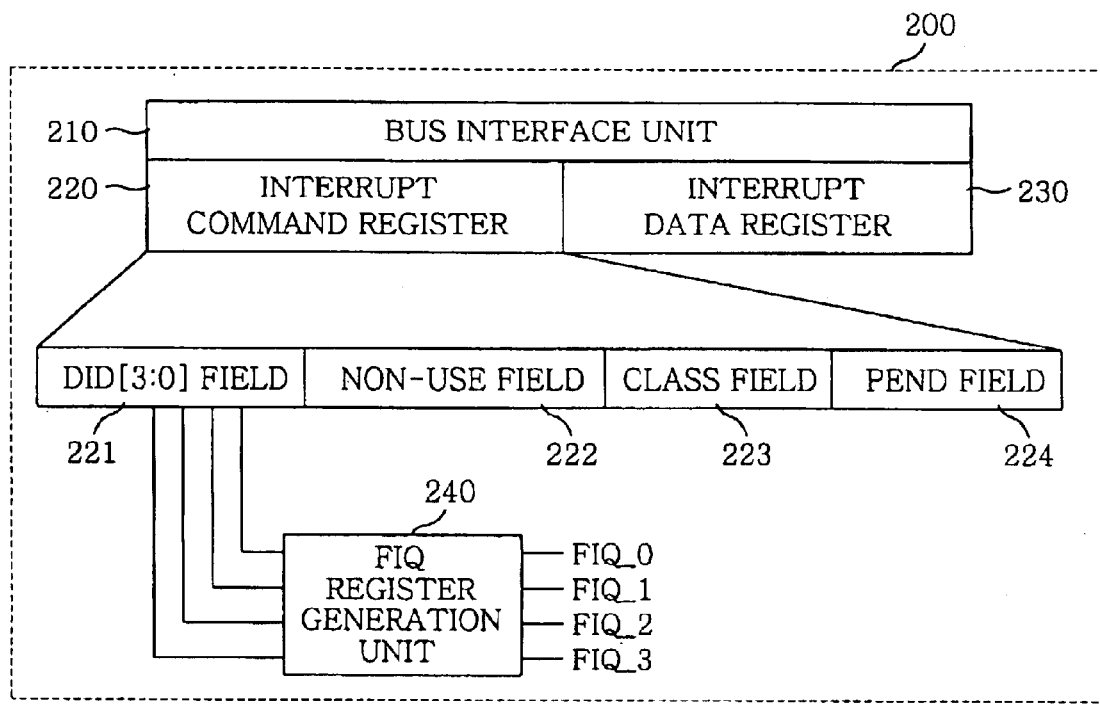
FIG. 3 is a detailed view showing the interrupt redirection unit of FIG. 1.

FIG. 3 is a detailed view showing the interrupt redirection unit 200 shown in FIG. 1. Referring to FIG. 3, the interrupt redirection unit 200 includes an internal bus interface unit 210, an interrupt command register 220, an interrupt data register 230 and an FIQ generation unit 240. The internal bus interface unit 210 is AMBA (Adavanced Microcontroller Bus Architecture) slave which provides read and write access of processors 100 and 300. AMBA is an open standard bus which is used as an internal bus in ARM-based system-on-chip. The interrupt command register 220 receives interrupt commands. The interrupt data register 230 temporarily stores the contents of each interrupt. The FIQ generation unit 240 requests an FTQ interrupt signal from a specific processor.

Referring to FIG. 3, the interrupt command register 220 is comprised of 32-bit registers, and specifically, the 32-bit registers are classified into a DID [3:0] field 221 used for designating a target processor for an interrupt redirection or interrupt request, a non-use field 222, a class field 223 used for discriminating whether a corresponding interrupt is generated by the interrupt redirection request or the inter-processor communication, and a pend field 224 used for representing whether an interrupt is in processing.

The DID [3:0] field 221 represents a target of the interrupt, and is used as input of the FIQ generation unit 240.

The FIQ generation unit 240 decodes the contents of the DID [3:0] field 221 and activates an FIQ signal connected to a specific processor.

The pend field 224 is a part for representing a processing status of the interrupt redirection unit 200, and set to "1" by a processor requesting an interrupt and cleared to "0" by a processor receiving the interrupt.

The interrupt data register 230 is comprised of 32-bit registers, and when it is used in the interrupt redirection, the interrupt data register 230 is used as a place where the master processor 300 copies the values in the status register of the vectored interrupt controller 400 and redirects the copied results to the slave processor 100. On the other hand, when the interrupt data register 230 is used in inter-processor communication, it is used as a place where the start address of a message of a fixed size, constructed in the shared memory is transferred from the master processor to the slave processor.

Figure 4A:
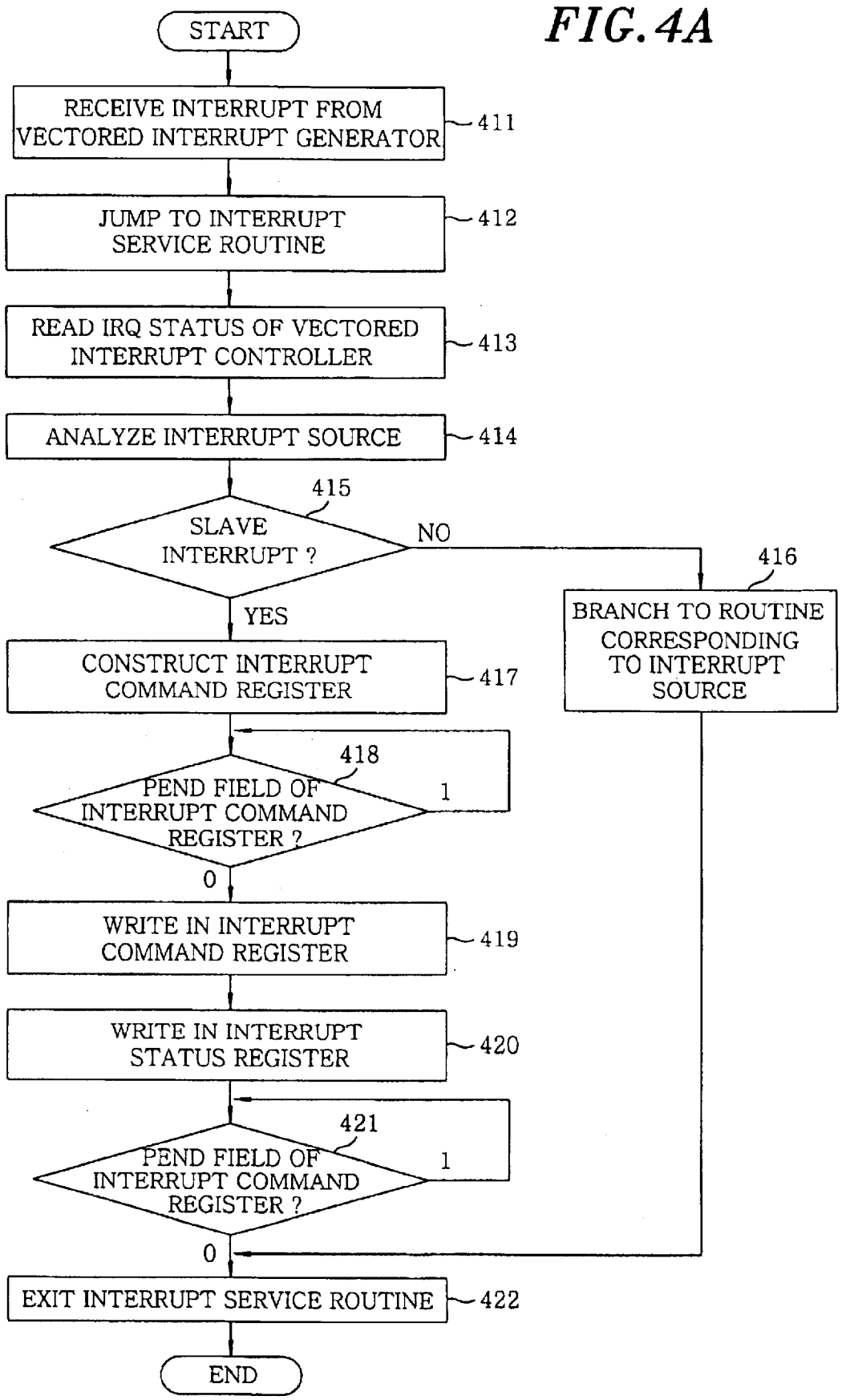
FIG. 4a is a flowchart of the operation of a master processor in an interrupt redirection method according to the present invention.

FIG. 4a is a flowchart of the operation of the master processor 300 in an interrupt redirection method according to the present invention. The method of FIG. 4a shows the process in which the master processor 300 redirects an interrupt received from the vectored interrupt controller 400 to the slave processor 100 using the interrupt redirection unit 200.

First, the master processor 300 receives an interrupt from the vectored interrupt controller 400 at step 411.

Then, the master processor 300 jumps to an interrupt service routine corresponding to the received interrupt at step 412.

The master processor 300 reads the interrupt status register of the vectored interrupt controller 400 at step 413.

The master processor 300 analyzes the contents of the interrupt status register at step 414.

The master processor 300 determines whether the received interrupt is for the master or the slave according to the analyzed results at step 415.

The master processor 300 branches to a service routine for processing a corresponding interrupt to process the interrupt if the received interrupt is for the master at step 416. After the interrupt service routine is completed, the master processor 300 exits the interrupt service routine and returns to the original program before the interrupt at step 422.

On the other hand, if the received interrupt is for the slave, the master processor 300 prepares contents of the interrupt command register to be sent to the interrupt redirection unit 200 at step 417.

The master processor 300 reads the interrupt command register 220 of the interrupt redirection unit 200 and checks the pend field 224 at step 418.

The master processor 300 sends an interrupt redirection command to be written into the interrupt command register 220 using a write operation if the pend field 224 is set to "0", that is, the interrupt redirection unit 200 is in an idle state at step 419.

Then, the master processor 300 writes the contents of the interrupt status register of the vectored interrupt controller 400 into the interrupt data register 230 of the interrupt redirection unit 200 at step 420.

The master processor 300 periodically checks the pend field 224 of the interrupt command register 220, such that the master processor 300 determines whether a requested interrupt is received by the slave processor 100 at step 421. If the pend field 224 is set to "0" as the slave processor 100 receives the interrupt redirection request from the master processor 300, then the master processor 300 exits the interrupt service routine and returns to the original program before the interrupt at step 422.

Figure 4B:
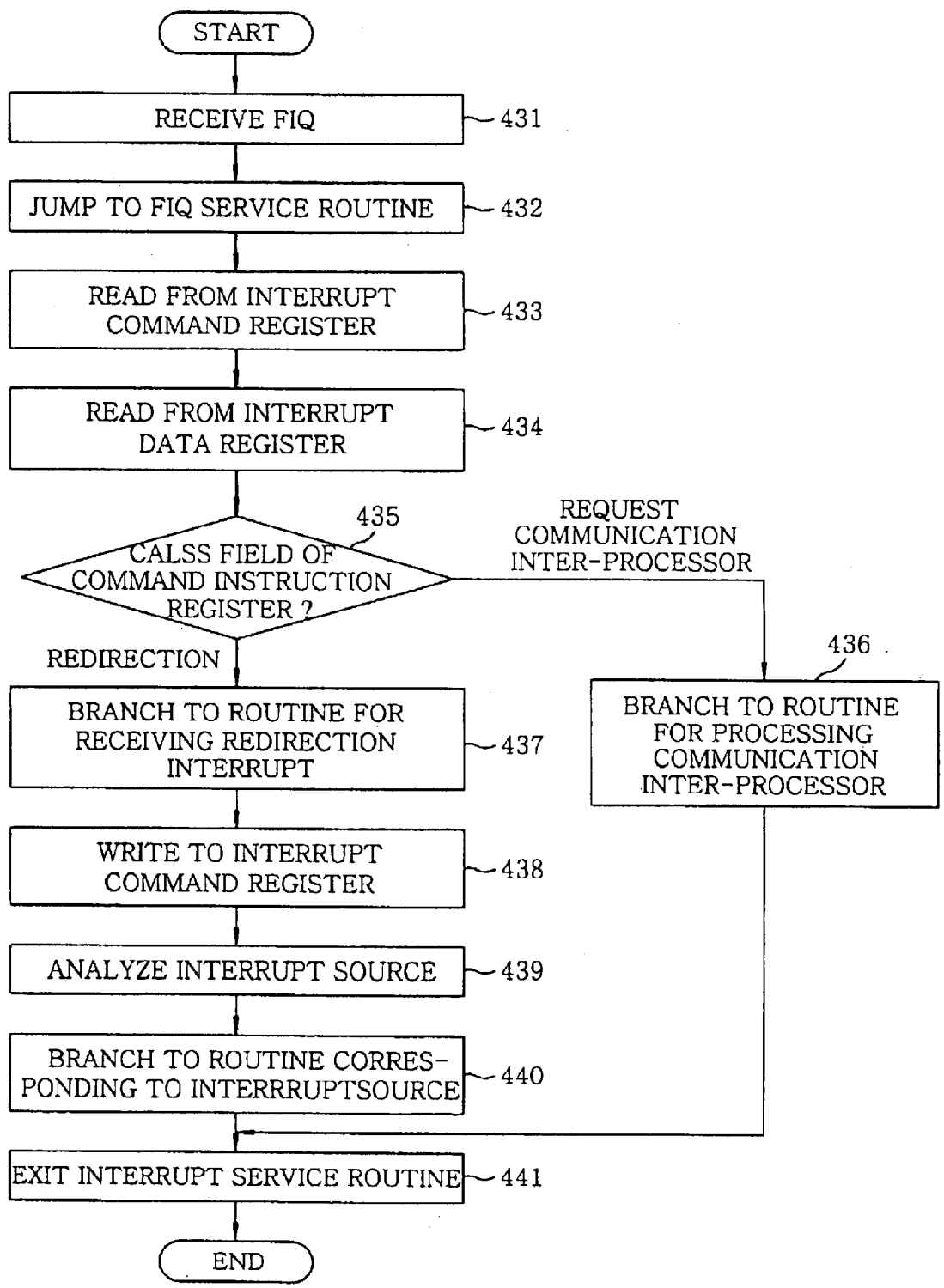
FIG. 4b is a flowchart of the operation of a slave processor in the interrupt redirection method of this invention.

FIG. 4b is a flowchart of the operation of the slave processor 100 in the interrupt redirection method according to the present invention. FIG. 4b shows the process in which the slave 100 processes a redirected interrupt when the interrupt redirection unit 200 requests an FIQ interrupt to the slave processor 100 in response to the interrupt redirection request of the master processor 300.

First, the slave processor 100 receives the FIQ from the interrupt redirection unit 200 at step 431.

The slave processor 100 jumps to an FIQ service routine at step 432.

The slave processor 100 reads the interrupt command register 220 at step 433.

Then, the slave processor 100 reads the interrupt data register 230 at step 434.

The slave processor 100 checks the class field 223 in the interrupt command register 220, such that it determines whether a corresponding interrupt is generated by an interrupt redirection or an inter-processor communication at step 435.

The slave processor 100 braches to an inter-processor communication process routine if it is determined that the interrupt is generated by the inter-processor communication request at step 436. After the inter-processor communication process routine is completed, the slave processor 100 exits the interrupt service routine and returns to an original program before the interrupt at step 441.

On the other hand, if it is determined that the interrupt is generated by interrupt redirection, the slave processor 100 branches to a redirection interrupt reception routine at step 437.

The slave processor 100 informs the master processor that the interrupt is normally received by clearing the pend field 224 of the interrupt command register 220 to "0" at step 438.

The slave processor 100 analyzes the source of the interrupt at step 439.

The slave processor 100 branches to an interrupt service routine corresponding to the source analyzed result at step 440. After the interrupt service routine is completed, the slave processor 100 exits the interrupt service routine and returns to the original program before the interrupt at step 441.

Figure 5A:
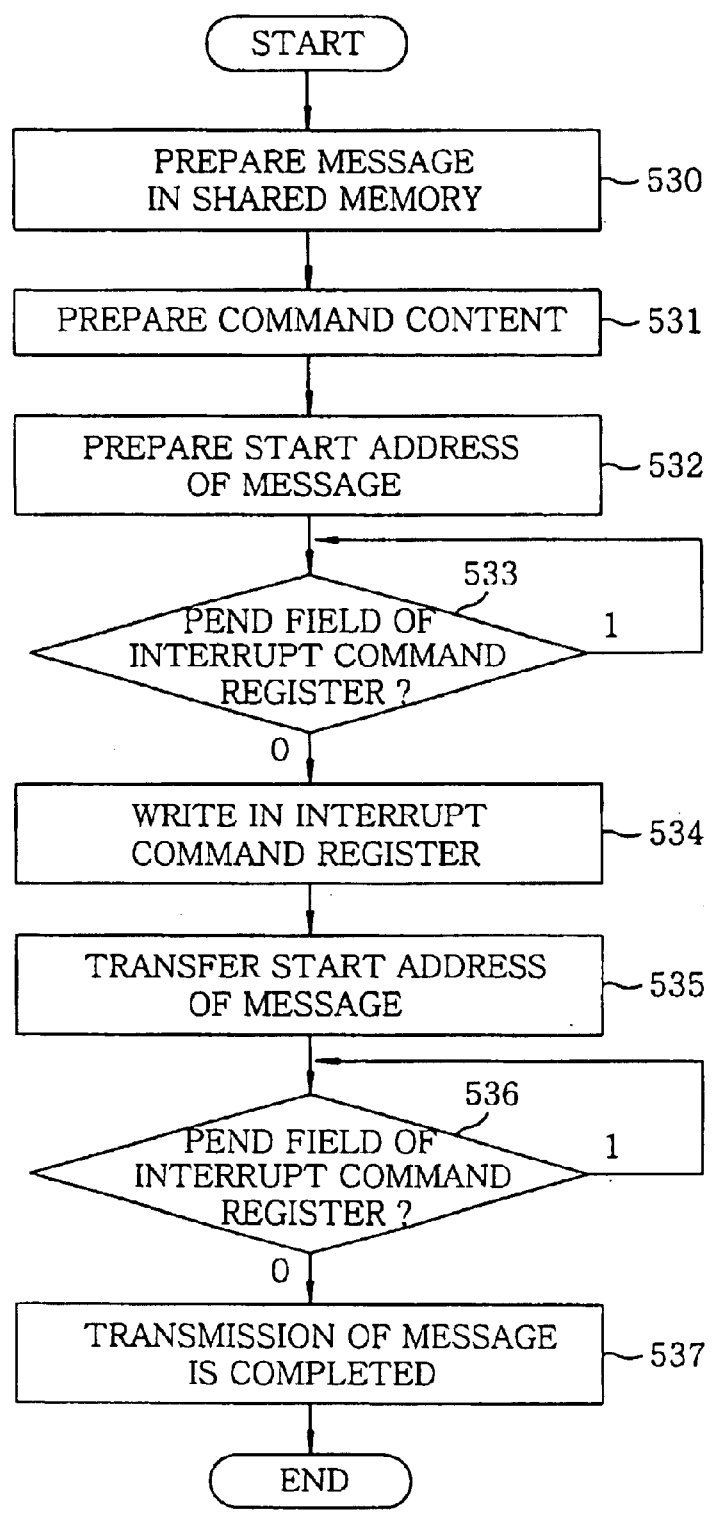
FIG. 5a is a flowchart of the operation of a transmission processor in the interrupt redirection method for inter-processor communication according to this invention.

FIG. 5a is a flowchart of the operation of a transmission processor in the interrupt redirection method for inter-processor communication according to the present invention. FIG. 5a shows the process in which the master processor 300 transmits a message to the slave processor 100 using the interrupt redirection unit 200. Here, the master processor 300 and the slave processor 100 correspond to the transmission processor and reception processor below, respectively.

First, the transmission processor prepares a transmission message with a fixed size in a region of the shared memory at step 530.

The transmission processor prepares contents corresponding to the interrupt command register 220 of the interrupt redirection unit 200 for designating the inter-processor communication so as to request the inter-processor communication to the interrupt redirection unit 200 at step 531. Then, the transmission processor prepares a message start address for the interrupt data register 230 at step 532.

The transmission processor checks the pend field 224 of the interrupt command register 220 of the interrupt redirection unit 200 at step 533.

The transmission processor generates a communication request to be written into the interrupt command register 220 of the interrupt redirection unit 200 through a write operation if the interrupt redirection unit 200 is idle according to the checked results of the pend field 224 at step 534.

The transmission processor performs a write operation to the interrupt data register 230 so as to transfer the message start address at step 535.

The transmission processor periodically checks the pend field 224 of the interrupt command register 220 to confirm whether or not the reception processor has received the message at step 536.

The transmission processor completes the message transmission after it confirms that the reception processor has received the message at step 537.

Figure 5B:
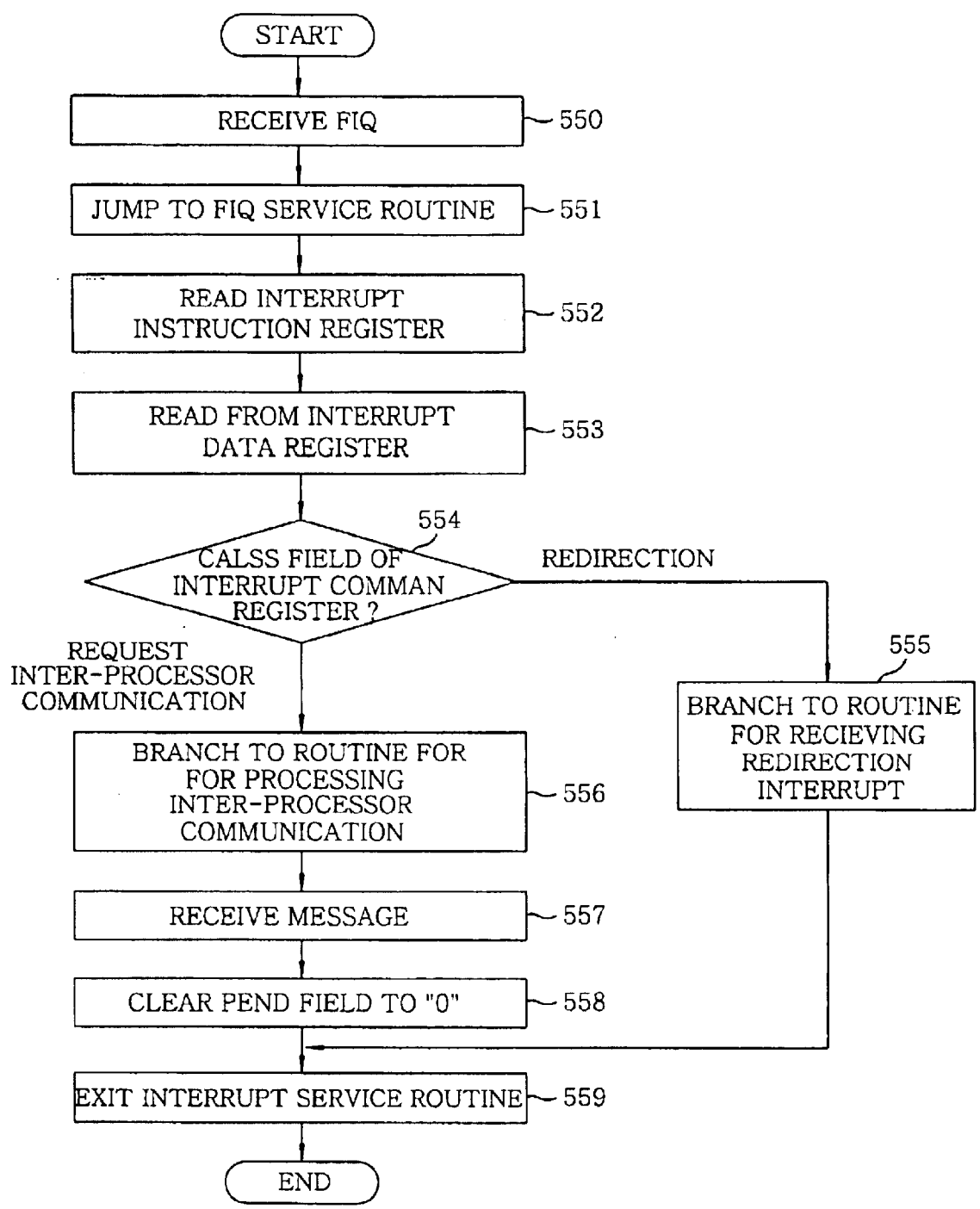
FIG. 5b is a flowchart of the operation of a reception processor in the interrupt redirection method for inter-processor communication of this invention.

FIG. 5b is a flowchart of the operation of the reception processor in the interrupt redirection method for inter-processor communication according to the present invention. The reception processor can recognize a message reception request due to the inter-processor communication by receiving an FIQ interrupt from the interrupt redirection unit 200.

First, the reception processor receives an FIQ interrupt from the interrupt redirection unit 200 at step 550.

The reception processor jumps to an FIQ service routine at step 551, and then reads the interrupt command register 220 at step 552. Then, the reception processor reads the interrupt data register 230 at step 553.

The reception processor checks the class field 223 in the read data from the interrupt command register 220 to determine whether a corresponding interrupt is generated by interrupt redirection or inter-processor communication at step 554.

The reception processor branches to a redirection interrupt reception routine if it is determined that the interrupt is generated by interrupt redirection according to the determined results at step 555. After the redirection interrupt reception routine is completed, the reception processor exits the interrupt service routine and returns to the original program before the interrupt at step 559.

On the other hand, if it is determined that the interrupt is generated by the inter-processor communication request, the reception processor branches to an inter-processor communication process routine at step 556.

The reception processor receives a message using the message start address received through the interrupt data register 230 at step 557.

The reception processor clears the pend field 224 of the interrupt command register 220 to "0" so as to inform the transmission processor of the reception of the message at step 558. Then, the reception processor exits the interrupt service routine and returns to the original program before the interrupt at step 559.

As described above, the present invention provides an interrupt redirection apparatus and method for inter-process communication, which provides hardware allowing a processor designated as a master processor to resend an interrupt received from a vectored interrupt controller to a slave processor when a system-on-chip, having a plurality of ARM processors therein is designed, thus realizing an interrupt distribution, and provides inter-processor communication using the same hardware, thus ultimately enabling an ARM processor based multiprocessor to be realized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An interrupt redirection apparatus for inter-processor communication, comprising:

a plurality of ARM processors;

an interrupt redirection unit for inter-processor communication between a transmission processor and a reception processor, comprising: an interrupt command register for designating targets and kinds of each interrupt to perform a function for receiving an inter-processor communication request command from a transmission processor and activating an interrupt request signal connected to a reception processor such that the transmission processor sends an inter-processor communication request interrupt to the reception processor, an interrupt data register for designating a start address of a fixed size of message, an interrupt signal generation unit for reading contents in the interrupt command register and activating an FIQ interrupt request signal connected to an ARM processor, and a bus interface unit used for providing read and write accesses of both the interrupt command register and the interrupt data register;

wherein the inter-processor communication between an ARM processor designated as a transmission processor and an ARM processor designated as a reception processor using the interrupt redirection unit comprising:

the message transmitting of the transmission processor comprising:

the transmission processor preparing a transmission message of a fixed size in a region of a preset shared memory, the transmission processor preparing contents of the interrupt command register to be sent to the interrupt redirection unit in order to request an inter-processor communication, the transmission processor preparing a message start address for the interrupt data register, the transmission processor checking the pend field of the interrupt command register of the interrupt redirection unit, the transmission processor performing a write operation to the interrupt command register so as to request the inter-processor communication if the pend field is "0" checked as idle, the transmission processor performing a write operation to the interrupt data register so as to transfer the message start address, the transmission processor confirming whether or not the reception processor has received the message by periodically checking the pend field of the interrupt command register, and the transmission processor completing the message transmission if its is confirmed that the reception processor has received the message;

the reception operation processing step comprising the steps of:

the reception processor receiving an FIQ interrupt from the interrupt redirection unit, the reception processor jumping to an FIQ service routine, the reception processor reading the interrupt command register, the reception processor reading the interrupt data registers;

the reception processor checking the class field in the interrupt command register to determine whether a corresponding interrupt is generated interrupt redirection or inter-processor communication, the reception processor branching to an inter-processor communication process routine if it is determined that the interrupt is generated by the inter-processor communication request according to the determined results, the reception processor receiving a message using the message start address transferred through the interrupt data register;

the reception processor clearing the pend field of the interrupt command register to "0" so as to inform the transmission processor of the reception of the message, and the reception processor exiting the interrupt service routine.

2. An interrupt redirection apparatus for inter-processor communication, comprising:

a plurality of ARM processors;

an interrupt redirection unit for inter-processor communication between a transmission processor and a reception processor, comprising: an interrupt command register for designating targets and kinds of each interrupt to perform a function for receiving an inter-processor communication request command from a transmission processor and activating an interrupt request signal connected to a reception processor such that the transmission processor sends an inter-processor communication request interrupt to the reception processor, an interrupt data register for designating a start address of a fixed size of message, an interrupt signal generation unit for reading contents in the interrupt command register and activating an FIQ interrupt request signal connected to an ARM processor, and a bus interface unit used for providing read and write accesses of both the interrupt command register and the interrupt data register;

wherein the interrupt command register comprises:

a DID field used for designating a target processor for an interrupt redirection or an interrupt request, and comprised of lower four bits;

a non-use field;

a class field used for discriminating whether a corresponding interrupt is generated by an interrupt redirection request or an inter-processor communication request; and a pend field is set to "1" by a processor requesting the interrupt and cleared to "0" by a processor receiving the interrupt in order to represent whether the corresponding interrupt is in processing;

wherein the inter-processor communication between an ARM processor designated as a transmission processor and an ARM processor designated as a reception processor using the interrupt redirection unit comprising:

the message transmitting of the transmission processor comprising:

the transmission processor preparing a transmission message of a fixed size in a region of a preset shared memory, the transmission processor preparing contents of the interrupt command register to be sent to the interrupt redirection unit in order to request an inter-processor communication, the transmission processor preparing a message start address for the interrupt data register, the transmission processor checking the pend field of the interrupt command register of the interrupt redirection unit, the transmission processor performing a write operation to the interrupt command register so as to request the inter-processor communication if the pend field is "0" and checked as idle, the transmission processor performing a write operation to the interrupt data register so as to transfer the message start address, the transmission processor confirming whether or not the reception processor has received the message by periodically checking the pend field of the interrupt command register, and the transmission processor completing the message transmission if its is confirmed that the reception processor has received the message;

the reception operation processing step comprising the steps of:

the reception processor receiving an FIQ interrupt from the interrupt redirection unit, the reception processor jumping to an FIQ service routine, the reception processor reading the interrupt command register, the reception processor reading the interrupt data register;

the reception processor checking the class field in the interrupt command register to determine whether a corresponding interrupt is generated by interrupt redirection or inter-processor communication, the reception processor branching to an inter-processor communication process routine if it is determined that the interrupt is generated by the inter-processor communication request according to the determined results, the reception processor receiving a message using the message start address transferred through the interrupt data register, the reception processor clearing the pend field of the interrupt command register to "0" so as to inform the transmission processor of the reception of the message, and the reception processor exiting the interrupt service routine.

* * * * *